United States Patent [19]
Gibling

[11] 3,807,744
[45] Apr. 30, 1974

[54] PIPE COUPLINGS

[76] Inventor: George Wynn Gibling, 24 Ashley Ter., Edinburgh 11, Scotland

[22] Filed: Sept. 7, 1971

[21] Appl. No.: 178,363

Related U.S. Application Data

[63] Continuation of Ser. No. 863,545, Oct. 3, 1969, abandoned.

[30] Foreign Application Priority Data
Oct. 17, 1968 Great Britain.................... 49308/68

[52] U.S. Cl.................... 277/207, 277/209, 285/58, 138/96, 277/DIG. 2
[51] Int. Cl............................................ F16j 15/32
[58] Field of Search ............ 138/96, 109, 133, 143, 138/145; 4/252; 285/56–60, 423; 277/164, 152, 179, 209, 212

[56] References Cited
UNITED STATES PATENTS

| | | | |
|---|---|---|---|
| 1,938,286 | 12/1933 | Elliott ................................ | 4/252 R |
| 2,924,472 | 2/1960 | Bush .................................. | 277/209 |
| 1,358,714 | 11/1920 | Douglas ........................... | 285/56 X |
| 2,544,324 | 3/1951 | Jepson ............................. | 277/164 X |
| 3,436,880 | 4/1969 | Kifer ............................. | 138/96 R X |
| 2,202,147 | 5/1940 | Gerriets ........................ | 138/96 R X |

FOREIGN PATENTS OR APPLICATIONS

| 1,478,921 | 3/1967 | France ................................... 4/252 |

Primary Examiner—Herbert F. Ross
Attorney, Agent, or Firm—Young & Thompson

[57] ABSTRACT

A coupling for connecting together two pipes, such as a water-closet outlet pipe and a soil pipe, comprises a tubular member of resilient material, e.g. copper, which is both lined and coated with flexible material, e.g. plasticised polyvinylchloride. The coupling is preferably manufactured by dipping the tubular member in a bath of the flexible material, but may alternatively be manufactured by moulding or vacuum-forming operations.

2 Claims, 15 Drawing Figures

PATENTED APR 30 1974 3,807,744

Inventor
GEORGE WYNN GIBLING
By Young & Thompson
Attorneys

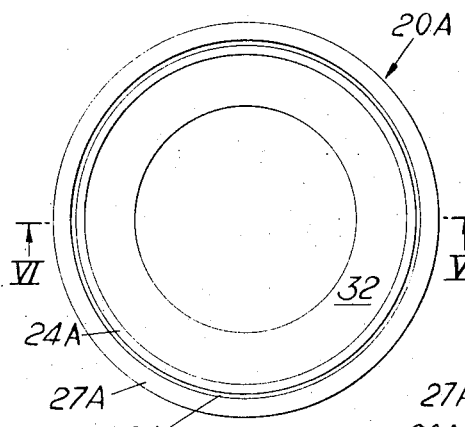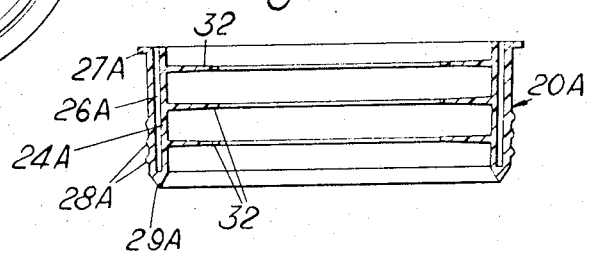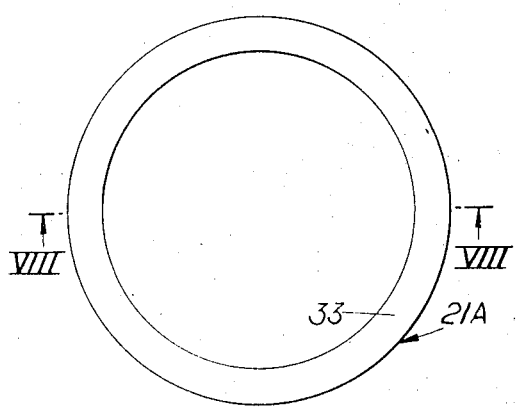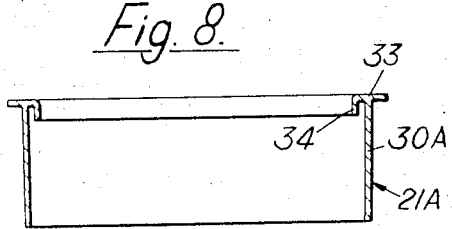

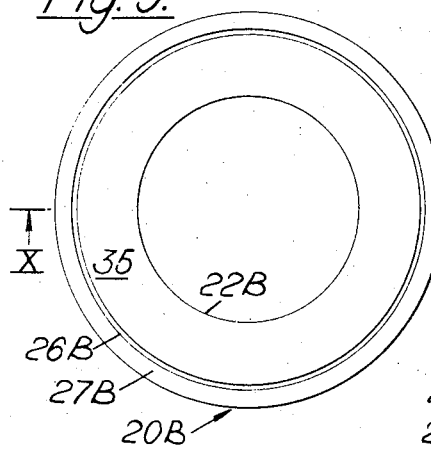
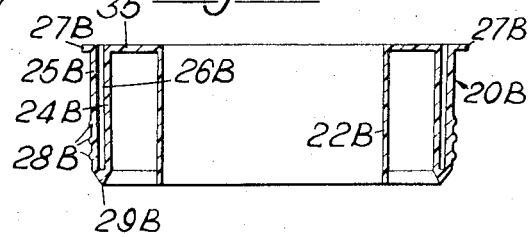
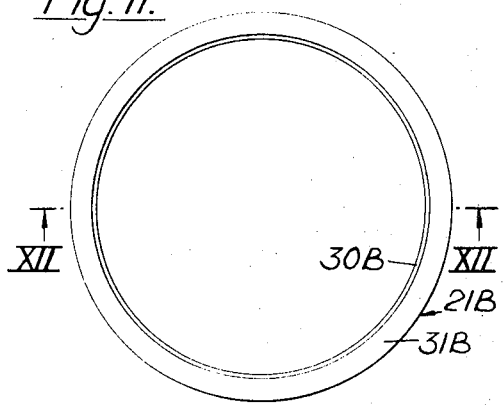
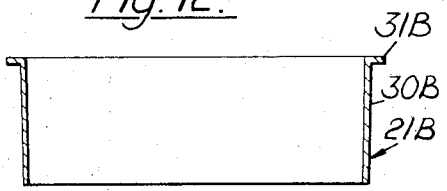
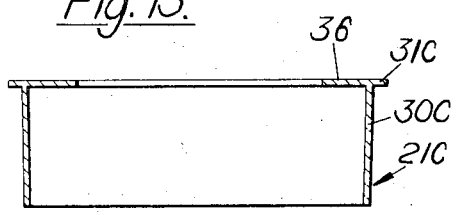

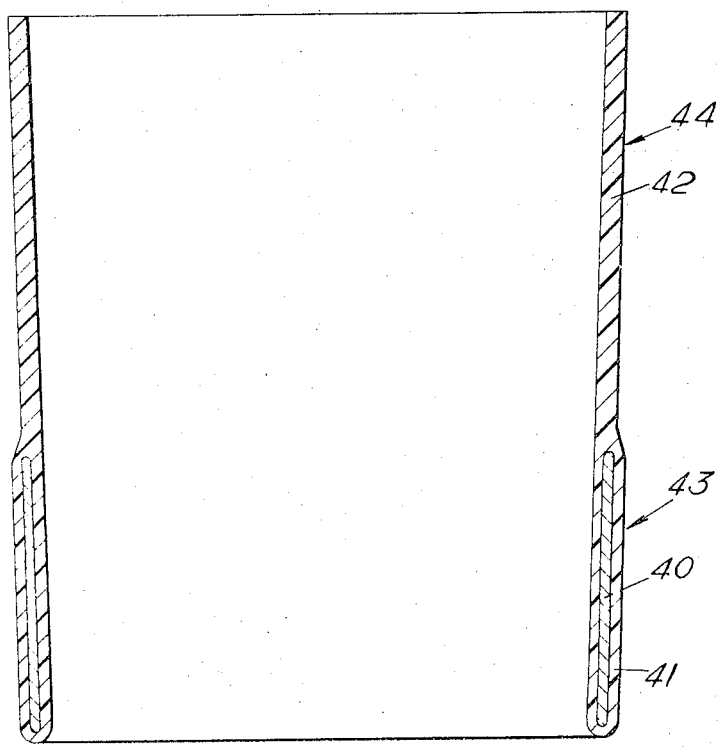
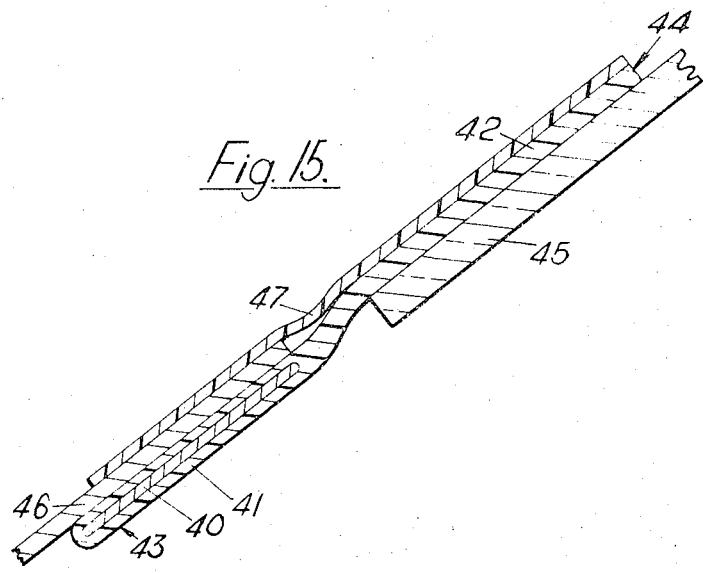

PIPE COUPLINGS

This invention relates to couplings for connecting together pipes such, for example, as water closet outlet and soil pipes.

An object of the present invention is to provide a pipe coupling which is efficient and is easily fitted and which permits of some flexibility at the joint.

The present invention is a pipe coupling comprising a resilient tubular member which is both lined and coated with flexible material.

The coupling is preferably produced by dipping the resilient tubular member in a liquid bath of the flexible material and thereafter allowing or causing the material both lining and coating the member to solidify. Alternatively, the resilient tubular member is embedded in the flexible material in a moulding operation. In a further alternative method of production, the coupling is made in two parts of which one is a sheath in the form of a tube of flexible material with an annular re-entrant recess in which is accommodated the other or core part, i.e., the resilient tube.

The lining of the tubular member may root throughout their external peripheries a plurality of inwardly directed washers.

Embodiments of the invention will now be described, by way of example, with reference to the accompanying drawings, in which:

FIG. 5 is a plan view, and FIG. 6 a section on the line VI—VI of FIG. 5, of the sheath-forming part of a second two-part coupling according to the invention;

FIG. 7 is a plan view, and FIG. 8 a section on the line VIII—VIII of FIG. 7, of the core-forming part of said second two-part coupling;

FIG. 9 is a plan view, and FIG. 10 a section on the line X—X of FIG. 9 of the sheath-forming part of a third two-part coupling according to the invention;

FIG. 11 is a plan view, and FIG. 12 a section on the line XII—XII of FIG. 11 of the core-forming part of said third two-part coupling;

FIG. 13 is a section similar to FIG. 12 of a modified core-forming part for said third two-part coupling;

FIG. 14 is a longitudinal axial section through a one-part coupling according to the invention; and FIG. 15 is a longitudinal sectional fragmentary view illustrating the coupling of FIG. 14 in use.

Figure 1:
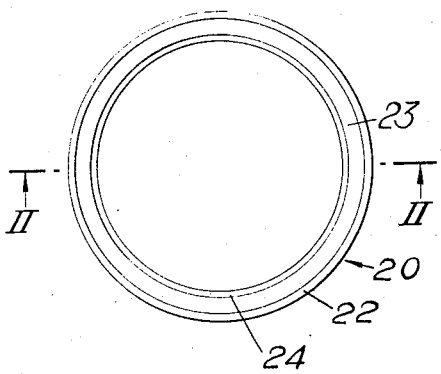
FIG. 1 is a plan view, and FIG. 2 a section on the line II—II of FIG. 1, of the sheath-forming part of a first two-part coupling according to the invention.
Figure 2:
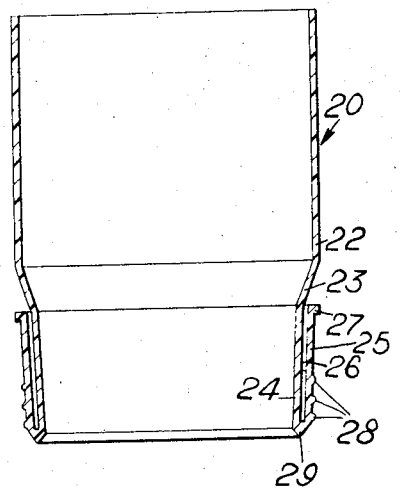
Figure 3:
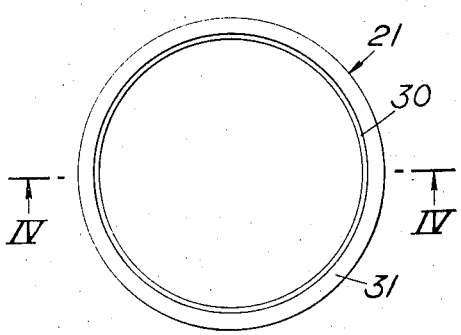
FIG. 3 is a plan view, and FIG. 4 a section on the line IV—IV of FIG. 3, of the core-forming part of said first two-part coupling.
Figure 4:
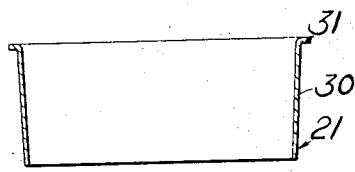

Referring firstly to FIG. 1 to 4 of the drawings, the first two-part coupling consists of a sheath-forming part 20 (FIGS. 1 and 2) and a core-forming part 21 (FIGS. 3 and 4). Both parts are substantially tubular in shape, the part 20 being of a flexible material such as a suitable plastics material, or natural or synthetic rubber, and the part 21 being resilient and of metal such as copper, or a suitable plastics material such as rigid polyvinylchloride (hereinafter called P.V.C.).

The part 20 includes a tubular sleeve 22 which merges into the greater diameter end of a frusto-conical median portion 23 whose smaller diameter end merges into the inner wall 24 of a double-walled spigot portion whose outer wall 25 is connected to the inner wall 24 by a return bend so that the walls define therebetween a re-entrant recess 26. The free end of the outer wall 25 is formed with an outwardly directed peripheral flange 27 and the outer surface of the outer wall is formed with circumferential ribs 28 which are closer to the return bend than to the flange. The return bend is of arrowhead formation externally as shown at 29, and the spigot portion converges slightly from the median portion 23. The part 20 is moulded to shape.

The part 21 consists of a tubular wall 30 which is a snug fit in the recess 26 and converges from one end to the other for this reason, an external outwardly extending flange 31 being provided at the greater diameter end of the wall 30.

In use of the coupling of FIGS. 1 to 4 in making a union between a water closet and a soil pipe, a sheath-forming part 20 of the appropriate size is selected and the core-forming part 21 is fitted into position where the wall 30 is accommodated in the recess 26 and the flange 31 overlies the flange 27. The spigot portion is then pushed home inside the soil pipe to form a sealed connection, and the sleeve 22 is fitted over the water closet outlet pipe. The sleeve 22 is of lesser diameter than the outlet pipe and has to be stretched while being fitted and a sealed connection is thereby effected. The sleeve may be fitted before the spigot portion, if desirable.

Referring now to FIGS. 5 to 8 of the drawings, parts corresponding to parts already identified with reference to FIGS. 1 to 4 are denoted by the same reference numerals with the suffix A added thereto. In this embodiment of the invention, the sheath-forming part 20A (FIGS. 5 and 6) provides both a spigot and a socket, and for this reason the inner surface of the inner wall 24A roots throughout their external peripheries three inwardly directed washers 32. The socket fulfils the function of the sleeve 22 of the first embodiment, and the washers 32 cling tightly to the wall of the pipe within the socket and provide an efficient seal. In the second embodiment of the invention, the flange 33 at the greater diameter end of the wall 30A of the core-forming part 21A projects both inwardly and outwardly, the inwardly projecting edge having a down-turned peripheral lip 34 to engage over the upper end of the wall 24A.

Referring now to FIGS. 9 to 12 of the drawings, parts already identified with reference to FIGS. 1 to 4 are denoted by the same reference numerals with the suffix B added thereto. In this embodiment of the invention, the sleeve 22B is located co-axially within the sheath-forming part 20B, an inwardly directed peripheral web 35 at the return-bend-remote end of the inner wall 24B integrating the latter with the sleeve 22B.

FIG. 13 shows a modified core-forming part 21C for use with the sheath-forming part 20B of FIGS. 9 and 10. In FIG. 13 the flange 31C extends both inwardly and outwardly of the tubular wall 30 to provide a ring 36 which is adapted to overlie the web 35.

The one-part coupling shown in FIG. 14 is produced by dipping the core-forming part 40 in a bath of liquid plasticised P.V.C., the part 40 being first treated with an adhesive which is compatible with the two materials involved namely the copper of the part 40 and the plasticised P.V.C. The dipping process per se forms no part of the present invention and will not be described in detail. Suffice to say that a covering 41 of the plasticised P.V.C., of about one-sixteenths inch in thickness, is formed about the part 40 and merges into a tubular sleeve 42 of about one eighth inch in thickness. The coupling thus comprises a spigot portion 43 for insertion into a soil pipe, and an integral socket portion 44 to be engaged about a W.C. outlet pipe. The internal diameter of the coupling at the transition from spigot to socket is about 3 7/8 inch reducing uniformly to 3 11/16 inch at the free end of the spigot portion 43, and increasing uniformly to 4 inches at the free end of the socket over a length of 3 inches. The external diameter at the free end of the spigot portion 43 is 4 1/16 inches and the diameter at the inner end of the spigot portion, i.e. the major diameter of the spigot portion, is 4 1/4 inches. The coupling of FIG. 14 is suitable for P.V.C. soil pipes whose inside diameters may vary from 4.075 inches to 4.199 inches.

The fragmentary view of FIG. 15 indicates the coupling of FIG. 14 in use, part 45 being a W.C. outlet pipe and part 46 being a soil pipe. The fitment of the coupling is as already described with reference to the FIGS. 1 to 4 embodiment of the invention. The reference numeral 47 denotes a flexible sleeve which may be fitted for aesthetic reasons only.

Manifestly different processes, such as dip-moulding injection-moulding and vacuum-forming, could be utilised in the manufacturing of couplings according to the invention.

I claim:

1. A pipe coupling comprising a tube of flexible material with an annular re-entrant recess and a resilient tubular member disposed in said recess, said tubular member converging from the open end of the re-entrant recess to the closed end of the re-entrant recess uniformly over the length of the tubular member, the free end of the outer wall defining the annular re-entrant recess having a first outwardly directed peripheral flange and the greater diameter end of the tubular member having a second outwardly directed peripheral flange which is exposed and overlies said first outwardly directed flange, said second outwardly directed flange being part of a flange construction the other part of which is an inwardly projecting flange at whose free edge is a peripheral lip engaging over the free end of the inner wall defining the annular re-entrant recess.

2. A pipe coupling comprising a tube of flexible material with an annular re-entrant recess and a resilient tubular member disposed in said recess, the free end of the outer wall defining the annular re-entrant recess having a first outwardly directed peripheral flange and the adjacent end of the tubular member having a second outwardly directed peripheral flange which is exposed and overlies said first outwardly directed flange, said second outwardly directed flange being part of a flange construction the other part of which is an inwardly projecting flange at whose free edge is a peripheral lip engaging over the free end of the inner wall defining the annular re-entrant recess.

* * * * *